Patented Mar. 14, 1933

1,901,307

UNITED STATES PATENT OFFICE

GEORG KRAENZLEIN, HEINRICH VOLLMANN AND MARTIN CORELL, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

HALOGENATED VAT DYESTUFFS OF THE 3.4.8.9- AND 4.5.8.9-DIBENZPYRENEQUINONE SERIES AND A PROCESS OF PREPARING THEM

No Drawing. Application filed November 25, 1929, Serial No. 409,752, and in Germany December 4, 1928.

The present invention relates to halogenated vat dyestuffs of the 3.4.8.9- and 4.5.8.9.-dibenzpyrenequinone series and to a process of preparing them.

We have found that halogen-containing dibenz- and isodibenzpyrenequinones of excellent purity are obtainable by causing a halogenating agent to react in a melt of alkali metal-chloride-aluminium chloride with a dibenz- or isodibenzpyrenequinone of the following general formula:

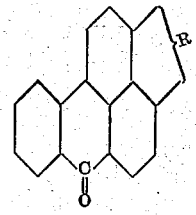

wherein R stands for the bivalent residue

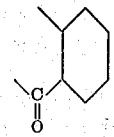

It is not necessary to start with the isolated dibenzpyrenequinones and to dissolve them in melted alkali metal-chloride-aluminium chloride, but the halogenation process may also be carried out by directly using the reaction mixture, i. e. the melt containing a dibenzpyrenequinone or isodibenzpyrenequinone, which results when subjecting a suitable aromatic ketone, such as, for instance, a 1.5- or 1.4-diaroylnaphthalene or a Bz-1-or-2-aroylbenzanthrone, to ring closure by heating such ketone in a melt of alkali metal-chloride-aluminium chloride.

As halogenating agents there may be used the halogens themselves as well as agents capable of yielding halogen, such as, for instance, sulfuryl chloride. For the purpose of introducing chlorine there may also be used, for instance, hydrochloric acid, set free during the closure of the ring, or aluminium chloride, in the presence of oxygen at elevated temperature. When carrying out the halogenation in the reaction mixture obtained by ring closure of the said ketones, the addition of halogen may take place at any stage, that is, either after the whole quantity of the ketone has undergone ring closure, or even if only a part thereof has been transformed into the corresponding pyrenequinone. The halogenation is advantageously carried out at temperatures of between about 80° C. and about 250° C.

The technical advantage achieved by the combination of the ring closure of the ketones of the kind referred to above with the halogenation process is quite obvious.

The halogen compounds obtainable according to the present invention are valuable dyestuffs and may also be used as intermediate products for the preparation of other dyestuffs. If the shades of the dyestuffs are not sufficiently clear, they may be improved by an aftertreatment with a hypochlorite.

The following examples serve to illustrate the invention, but they are not intended to limit it thereto; the parts are by weight.

(1) 33 parts of 1.5-dibenzoylnaphthalene are heated with 330 parts of sodium-chloride-aluminium chloride at about 120° to 130° C. while introducing oxygen into the melt. After the transformation of the dibenzoylnaphthalene into dibenzpyenequinone is complete, 40 parts of bromine are added drop by drop to the melt, advantageously while thoroughly stirring the mixture. The color of the melt which is at first violet gradually turns blue. The melt is decomposed by adding water thereto and the brominated dyestuff is obtained in the form of brownish orange flakes. A subsequent treatment with an alkali metal hypochlorite solution yields a clear orange colored paste. The dyestuff thus obtained dyes cotton clear golden-orange tints.

As the analysis shows a dibromoderivative of the following probable constitution is obtained:

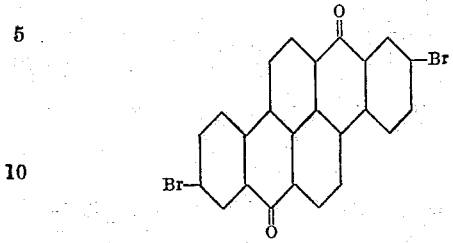

When using a larger quantity of bromine there can be obtained, without difficulty, brominated dibenzpyrenequinones containing more than two bromine atoms, showing a somewhat more reddish tint.

(2) A melt of 50 parts of 1.5-dibenzoylnaphthalene and 750 parts of sodium chloride-aluminium chloride is prepared and heated at about 120° to 130° C. until half of the quantity of the diketone has been transformed into the corresponding dibenzpyrenequinone which may easily be ascertained by observing the color of the solution. Then chlorine is introduced into the melt and heating is continued. During this operation the color of the solution turns from reddish-violet to blue and green-blue. By interrupting in due time the introduction of chlorine, it is possible to prepare di-, tri-, tetra-, and even higher chlorinated derivatives of 3.4.8.9 dibenzpyrene-5.10-quinone.

(3) A melt of 10 parts of 2-benzoylbenzanthrone and 150 parts of sodium chloride-aluminium chloride is prepared and heated at 110° to 125° C. for about 15 hours, while stirring and introducing oxygen. Thereupon 15 parts of bromine vapor, undiluted or mixed with air or oxygen, are introduced into the reaction mixture at about 120° C., while well stirring. By pouring the mixture into water the dyestuff which has been formed separates in the form of bordeaux red flakes. It is identical with the dibromo -4.5.8.9-dibenzpyrene-3.10-quinone obtained by reacting upon 4.5.8.9-dibenzpyrenequinone dissolved in chlorosulfonic acid with bromine in a quantity sufficient for the introduction of two bromine atoms.

(4) By introducing chlorine instead of bromine vapor into the melt prepared according to Example 3 there is obtained a dichloro-iso-4.5.8.9-dibenzpyrene-3.10-quinone or a polychloro-iso- 4.5.8.9-dibenzpyrene 3.10-quinone, according to the duration of the action of chlorine. The dichloro derivative thus obtained dyes cotton clear orange tints.

(5) 300 parts of 1.5-dibenzoylnaphthalene in 2500 parts of sodium-chloride-aluminium chloride are heated until the diketone is transformed into the corresponding dibenzpyrenequinone. Thereupon 252 parts of sulfuryl chloride are slowly added drop by drop at between 150° C. and 160° C. while vigorously stirring. The violet-blue melt is worked up and dichloro-3.4.8.9-dibenzpyrene-5.10-quinone is isolated. It is an orange yellow powder which crystallizes from nitrobenzene in the form of orange needles and dyes cotton reddish yellow tints. It dissolves in concentrated sulfuric acid to a blue solution.

By suitably varying the proportion of sulfuryl chloride chlorodibenzpyrenequinones containing various numbers of chlorine atoms are easily obtainable. The mono-, di- and tri-chloro-dibenzpyrenequinones yield tints of a more reddish shade than the unsubstituted dibenzpyrenequinone.

(6) 42 parts of sulfuryl chloride are introduced drop by drop at 140° C. to 160° C. into a melt of 3.4.8.9-dibenzpyrene-5.10-quinone treated with bromine according to Example 1. The melt is decomposed and the dyestuff is isolated. The new dyestuff contains bromine and chlorine atoms. It dyes cotton golden yellow tints.

A very similar dyestuff may be obtained by first adding drop by drop sulfuryl chloride and then bromine.

(7) 10 parts of 4.5.8.9-dibenzpyrenequinone-5.10 are dissolved in a melt of 80 parts of sodium-chloride-aluminium chloride at 140° C. and 4–5 parts of sulfuryl chloride are added drop by drop while vigorously stirring. On decomposition of the melt with water the chloro-dyestuff separates in the form of red flakes which yield red shades of a more bluish hue than the parent material.

(8) A melt of 1.4-dibenzoylnaphthalene and sodium-chloride-aluminium chloride is heated at about 125° C.–130° C. until the formation of the isodibenzpyrenequinone is complete or nearly complete. Thereupon the temperature is raised to between 160° C. and 230° C. and a further quantity of oxygen is introduced while thoroughly stirring until a test portion dyes a more bluish tint than the unsubstituted 4.5.8.9-dibenzpyrenequinone-3.10. According to the duration of the further action of oxygen, aluminium chloride and hydrochloric acid, a mono- or -polychloro-dibenzpyrenequinone is obtained. On adding solid oxidizing agents to the melt of aluminium chloride at elevated temperature instead of introducing oxygen into the molten mass, there may also be easily obtained chlorinated dibenzpyrenequinones.

(9) 20 parts of 3.4.8.9-dibenzpyrenequinone-5.10 are dissolved in a melt of 1600 parts of sodium-chloride-aluminium chloride and after addition of 16 parts of iodine the whole is vigorosly stirred for 4 hours. After the decomposition of the melt the iododibenzpyrenequinone separates in the form of orange-brown flakes. It crystallizes from nitrobenzene in orange yellow laminæ and dissolves in concentrated sulfuric acid to a reddish blue solution.

We claim:

1. The process which comprises reacting upon a compound of the following general formula:

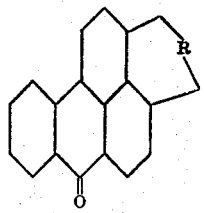

wherein R stands for the bivalent residue

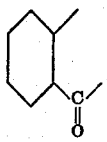

with a halogenating agent in the presence of alkali metal chloride-aluminium chloride, while heating.

2. The process which comprises reacting upon a compound of the following general formula:

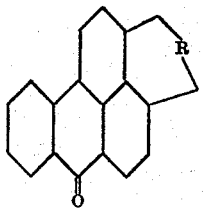

wherein R stands for the bivalent residue

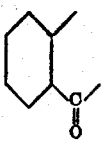

with a halogenating agent in the presence of alkali metal chloride-aluminium chloride at a temperature of between about 80° C. and about 250° C.

3. The process which comprises reacting upon 3.4.8.9-dibenzpyrene-5.10-quinone with a halogenating agent in the presence of alkali metal chloride-aluminium-chloride, while heating.

4. The process which comprises reacting upon 3.4.8.9-dibenzpyrene-5.10-quinone with a halogenating agent in the presence of alkali metal chloride-aluminium-chloride at a temperature of between about 80° C. and about 250° C.

5. The process which comprises reacting upon 3.4.8.9-dibenzpyrene-5.10-quinone with sulphuryl chloride in the presence of sodium-chloride-aluminium chloride at a temperature of between about 150° C. and about 160° C.

6. As a new product dichloro-3.4.8.9-dibenzpyrene-5.10-quinone of the following probable formula:

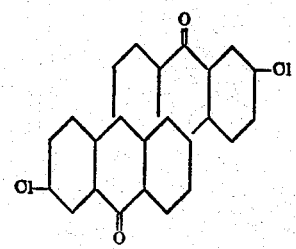

being an orange yellow powder which crystallizes from nitrobenzene in the form of orange needles, dissolving in concentrated sulfuric acid to a blue solution and dyeing cotton reddish-yellow tints.

In testimony whereof, we affix our signatures.

GEORG KRAENZLEIN.
HEINRICH VOLLMANN.
MARTIN CORELL.